US011255112B2

(12) United States Patent
Sturm et al.

(10) Patent No.: US 11,255,112 B2
(45) Date of Patent: Feb. 22, 2022

(54) MOTOR VEHICLE DOOR LOCK

(71) Applicant: Kiekert AG, Heiligenhaus (DE)

(72) Inventors: Christian Sturm, Krefeld (DE); Bernhard Drost, Isselburg (DE); Michael Scholz, Essen (DE); Holger Schiffer, Meerbusch (DE)

(73) Assignee: Kiekert AG, Heiligenhaus (DE)

( * ) Notice: Subject to any disclaimer, the term of this patent is extended or adjusted under 35 U.S.C. 154(b) by 468 days.

(21) Appl. No.: 16/331,164

(22) PCT Filed: Aug. 1, 2017

(86) PCT No.: PCT/DE2017/100647
§ 371 (c)(1),
(2) Date: Mar. 7, 2019

(87) PCT Pub. No.: WO2018/050148
PCT Pub. Date: Mar. 22, 2018

(65) Prior Publication Data
US 2019/0257122 A1 Aug. 22, 2019

(30) Foreign Application Priority Data
Sep. 14, 2016 (DE) ...................... 10 2016 117 281.2

(51) Int. Cl.
*E05B 83/24* (2014.01)
*B62D 25/12* (2006.01)
(Continued)

(52) U.S. Cl.
CPC .............. *E05B 83/24* (2013.01); *B62D 25/12* (2013.01); *E05C 19/006* (2013.01); *E05D 15/58* (2013.01);
(Continued)

(58) Field of Classification Search
CPC .......... E05B 83/24; E05B 79/20; E05B 81/66; E05B 83/247; B62D 25/12; E05C 19/006; E05D 15/58; E05D 15/56; E05Y 2900/536
(Continued)

(56) References Cited

U.S. PATENT DOCUMENTS 6,257,657 B1 * 7/2001 Sasaki ................... B60R 21/013
180/69.21
6,530,449 B2 * 3/2003 Sasaki .................... B60R 21/38
180/274
(Continued)

FOREIGN PATENT DOCUMENTS

CN 103806772 A 5/2014
CN 105927066 A 9/2016
(Continued)

OTHER PUBLICATIONS

International Search Report and Written Opinion for corresponding Patent Application No. PCT/DE2017/100647 dated Nov. 28, 2017.
(Continued)

*Primary Examiner* — Christine M Mills
*Assistant Examiner* — Yahya Sidky
(74) *Attorney, Agent, or Firm* — Renner, Otto, Boisselle & Sklar, LLP

(57) ABSTRACT

A motor vehicle bonnet lock includes a locking mechanism which substantially consists of a rotary latch and a pawl. The locking mechanism interacts with a striker element on a bonnet. The lock further has an unlocking/opening mechanism for the bonnet, which mechanism is equipped with a release element provided in the interior of a motor vehicle body. It is required to operate the release element preferably twice to open the bonnet. The locking mechanism is transferred to a pre-latched position after the release element has been operated at least once, with the striker element still being trapped. The bonnet is opened from said pre-latched position by a movement in its longitudinal direction.

10 Claims, 5 Drawing Sheets

(51) Int. Cl.
  *E05C 19/00* (2006.01)
  *E05D 15/58* (2006.01)
  *E05B 79/20* (2014.01)
  *E05B 81/66* (2014.01)
  *E05D 15/56* (2006.01)

(52) U.S. Cl.
  CPC .............. *E05B 79/20* (2013.01); *E05B 81/66* (2013.01); *E05B 83/247* (2013.01); *E05D 15/56* (2013.01); *E05Y 2900/536* (2013.01)

(58) Field of Classification Search
  USPC ......... 296/193.11; 180/69.2, 69.21; 292/201, 292/216, DIG. 23, DIG. 14, DIG. 65
  See application file for complete search history.

(56) References Cited

U.S. PATENT DOCUMENTS

| | | | | |
|---|---|---|---|---|
| 7,231,995 | B1 * | 6/2007 | Polz | ............ B60R 21/34 16/222 |
| 7,537,272 | B2 * | 5/2009 | Hirata | ............ B60R 21/38 296/187.04 |
| 2003/0183434 | A1 * | 10/2003 | Schillaci | ............ E05C 17/24 180/69.21 |
| 2012/0084942 | A1 * | 4/2012 | Mehta | ............ B60R 21/38 16/223 |
| 2014/0319848 | A1 | 10/2014 | Fannon | |

FOREIGN PATENT DOCUMENTS

| | | | |
|---|---|---|---|
| DE | 60109379 T2 | 5/2006 | |
| DE | 19938687 B4 | 10/2007 | |
| DE | 102007008700 A1 | 8/2008 | |
| DE | 102012212542 A1 | 2/2013 | |
| DE | 102011114148 A1 * | 3/2013 | ............ E05B 83/24 |
| DE | 102012111397 A1 | 2/2014 | |
| DE | 102014018068 A1 | 6/2016 | |
| JP | U6273066 | 5/1987 | |

OTHER PUBLICATIONS

English Translation of Notice of Reasons for Rejections dated Mar. 23, 2021, for related Japanese Patent Application No. 2019-535437.
English Translation of Second Office Action for related Chinese Patent Application No. 2017800565738.

* cited by examiner

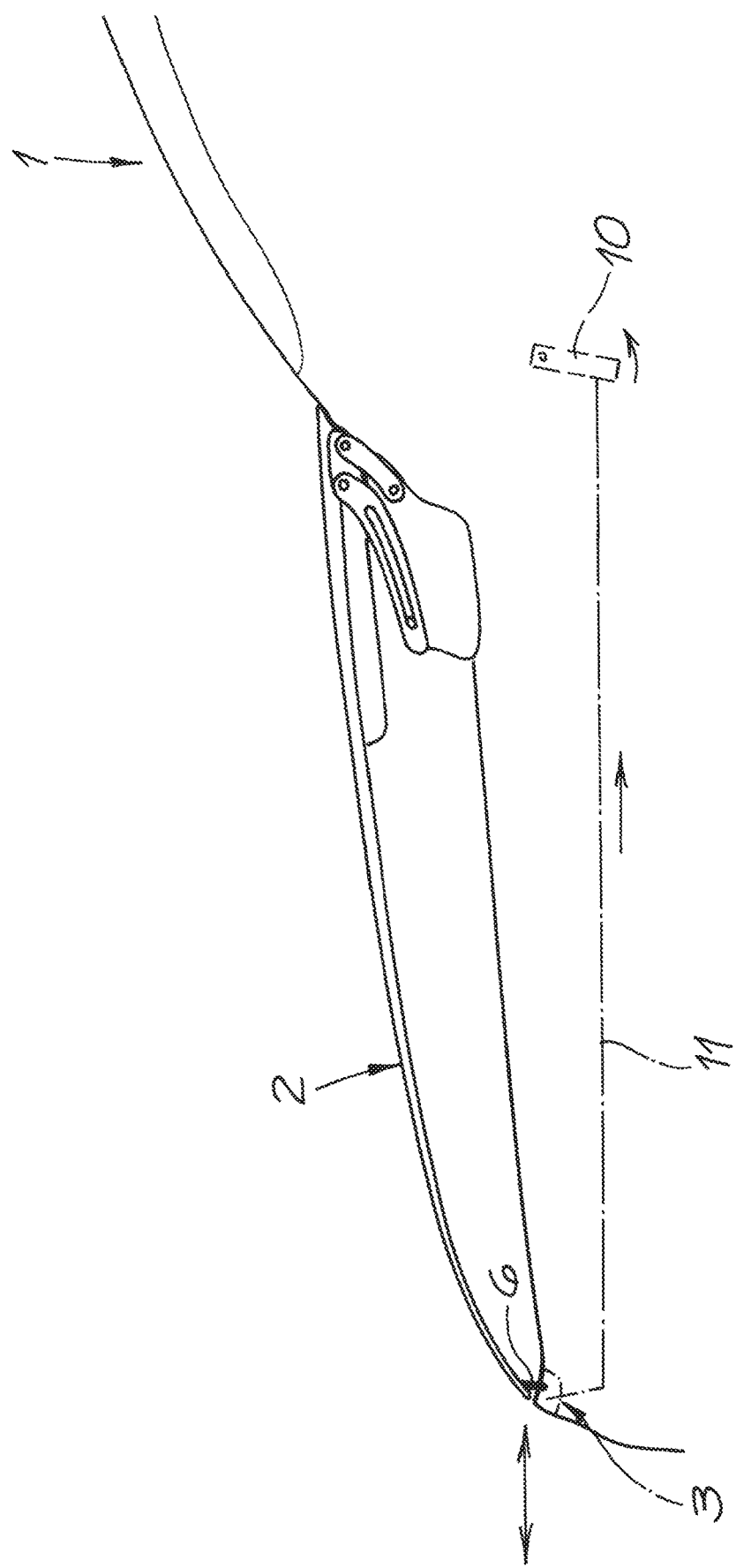

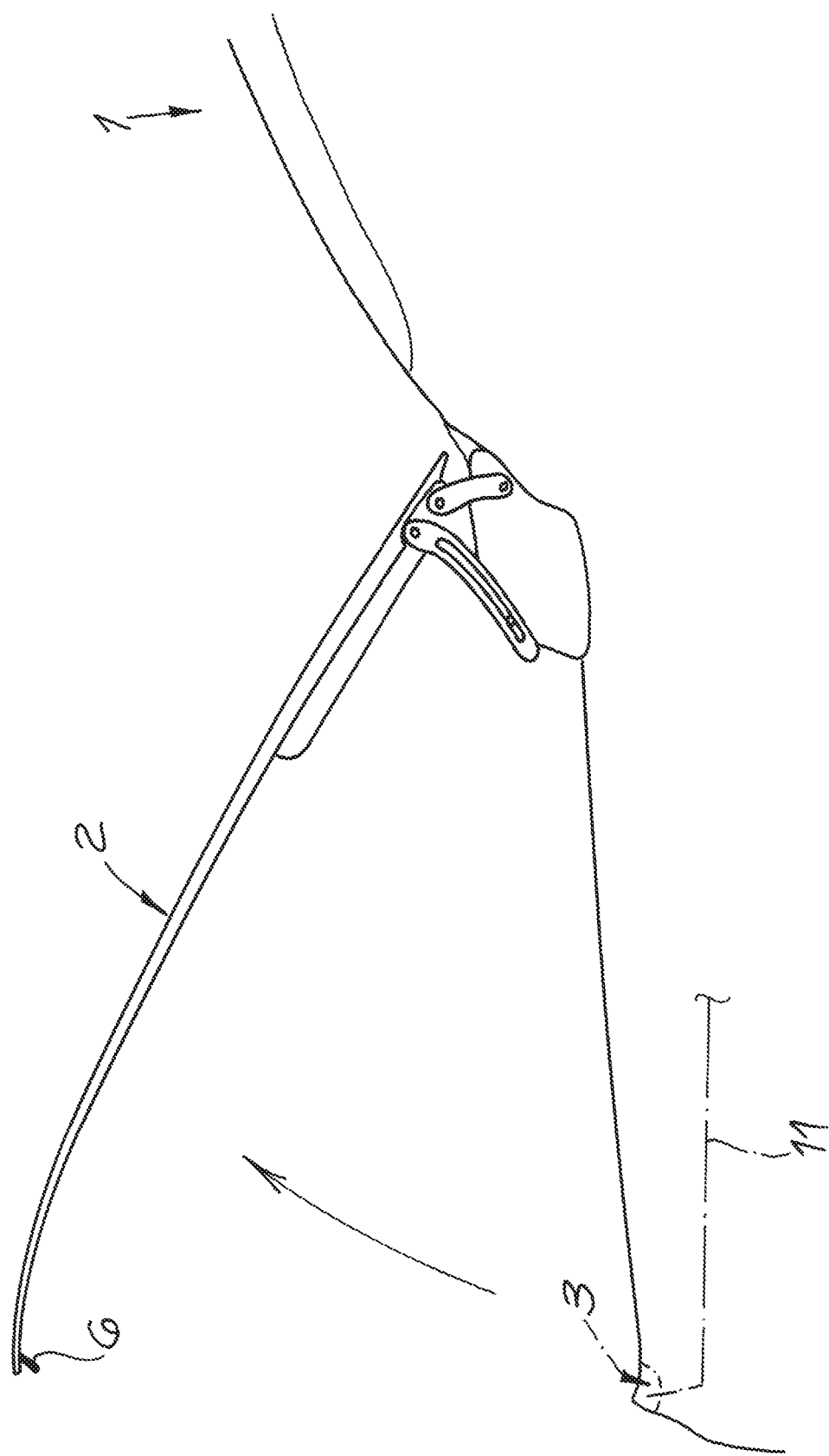

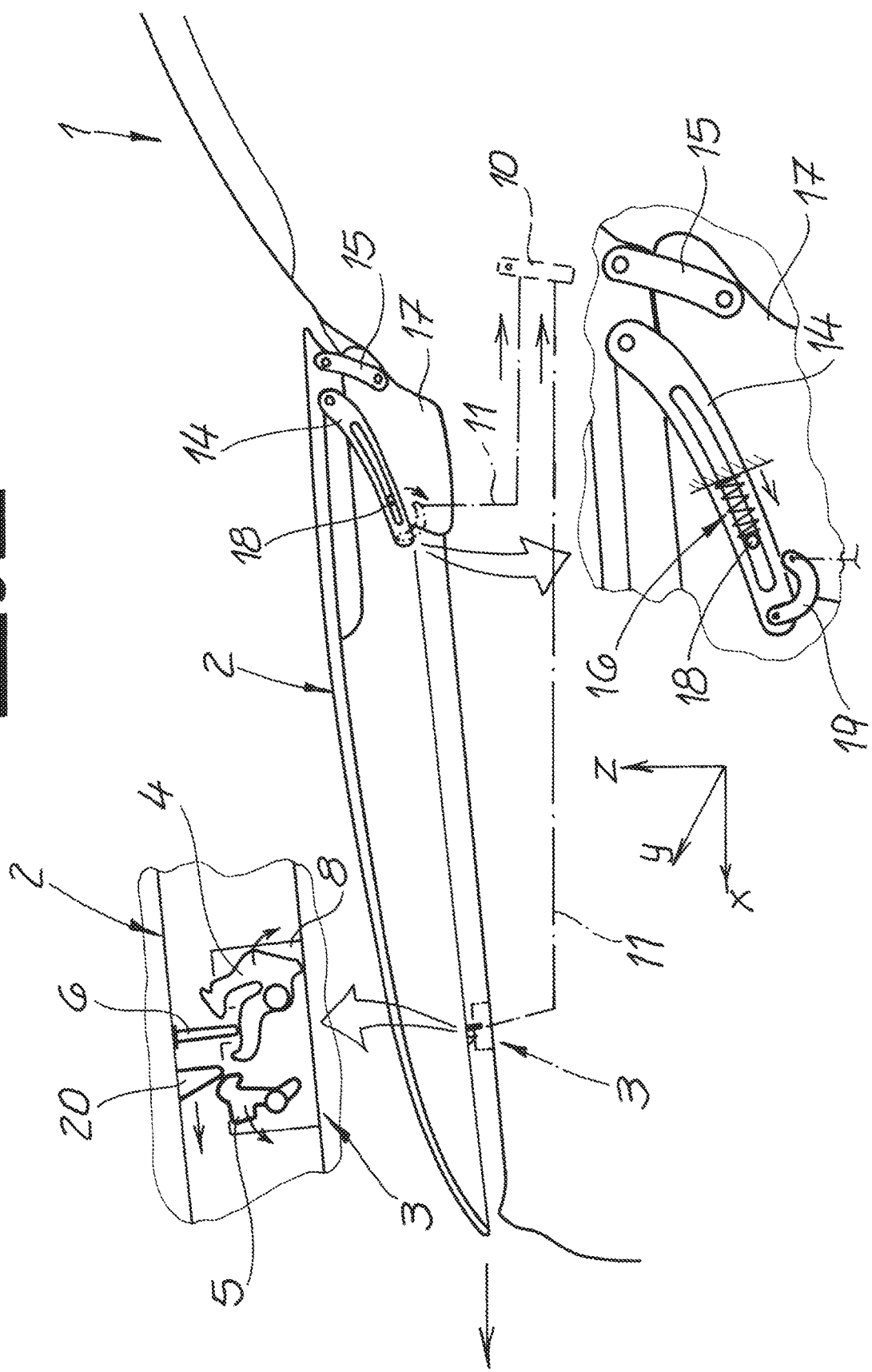

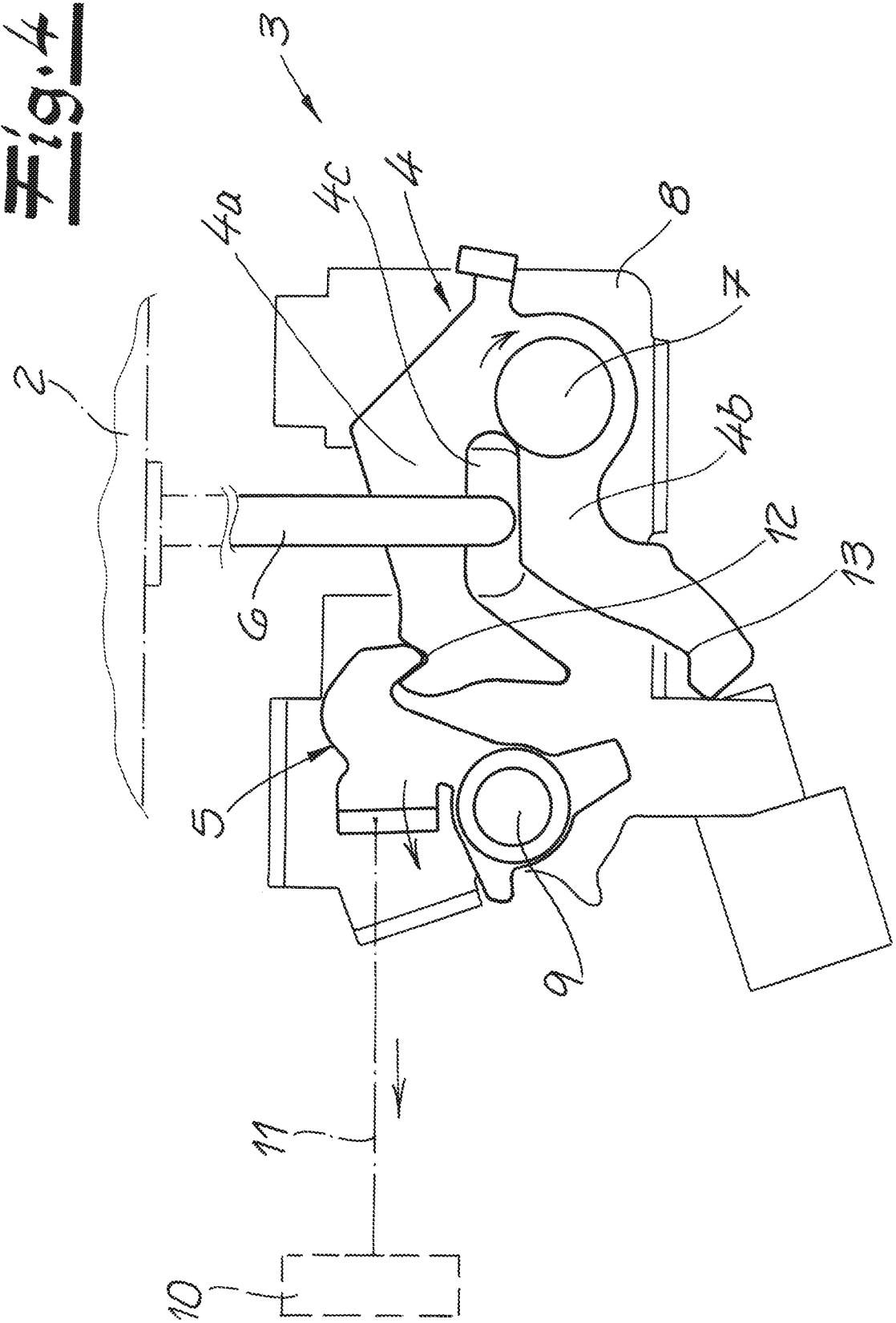

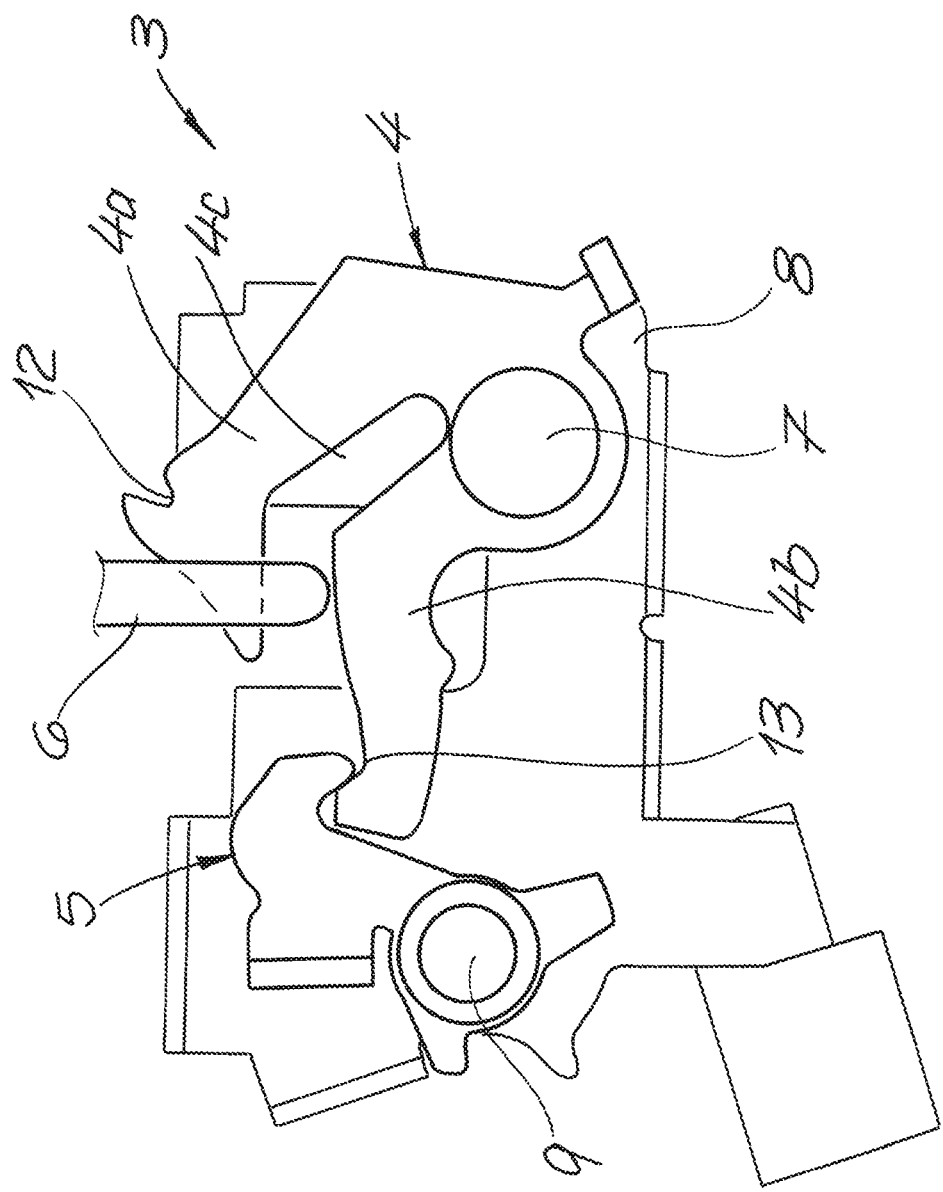

MOTOR VEHICLE DOOR LOCK

FIELD OF DISCLOSURE

The invention relates to a motor vehicle door lock, particularly a motor vehicle bonnet lock, provided with a locking mechanism which substantially consists of a rotary latch and a pawl. The locking mechanism interacts with a latch holder bracket on a bonnet, which further has an unlocking/opening mechanism for the bonnet featuring a mechanism equipped with a release element provided in the interior of a motor vehicle body. Preferably, it is required to operate the release element twice to open the bonnet.

BACKGROUND OF DISCLOSURE

Motor vehicle door locks and in particular motor vehicle bonnet locks, which are used in large numbers in practice, usually have a rotary latch hook in addition to the locking mechanism comprised of a rotary latch and pawl. For this reason one speaks also of so-called catch hook locks, as they are described in detail in the DE 199 38 687 B4. In the closed position of the bonnet and consequently of the locking mechanism, the catch hook in addition to the locking mechanism ensures that the locking bolt is secured in place. This provides twice the safety, so to speak.

To open such a motor vehicle door lock, at least one actuation of the release element of the unlocking/opening mechanism is required. The release element can be designed as a loop inside the vehicle body for this purpose. A Bowden cable may be connected to the release element as a connecting element, so that with an action on the release element, the pawl is lifted from its engagement with the rotary latch. Although the locking mechanism is opened by this, the locking bolt is still secured with the help of the catch hook. To open the bonnet, it is therefore necessary for an operator to leave the vehicle and swivel the catch hook through a slot between the bonnet and the vehicle body when the latch is open, so that the locking bolt or latch holder bracket is then released and the bonnet can be opened. Such an approach is increasingly criticized for reasons of comfort.

For this reason, the generic DE 10 2012 212 542 A1 proposes a motor vehicle door lock with a first and second bonnet latch. With the help of the release element inside the vehicle body, the first motor bonnet latch is unlocked with the first actuation of the release element and then the second motor bonnet latch with the second actuation of the release element. This is done from the inside of the vehicle and is therefore particularly comfortable.

However, with the current state of the art, there is the problem that the operator acts twice on the release element as described, which is necessary to open the bonnet. If the bonnet is not opened, the operator can still drive off with the vehicle. In the worst case scenario, this can cause the bonnet to swing open uncontrollably and suddenly obstruct the forward view, which represents a considerable safety risk. The invention intends to provide an overall remedy here.

SUMMARY OF DISCLOSURE

The invention is based on the technical problem of further developing such a motor vehicle door lock in such a way that safety is increased with a simple design.

In order to solve this technical problem, a motor vehicle door lock of the same type is characterized within the scope of the invention by the fact that, after at least one actuation of the release element, the locking mechanism assumes a pre-ratchet position with the locking bolt or latch holder bracket still caught, the bonnet being opened from the pre-ratchet position by a movement in its longitudinal direction.

In this way, the invention ensures that a single or preferably double actuation of the release element always leads to or results in the locking mechanism of the motor vehicle door lock assuming a pre-ratchet position. In this pre-ratchet position, the pawl has dropped into a pre-ratchet of the rotary latch. The locking bolt or latch holder bracket is still caught. The consequence of this is that even in such a case, the motor vehicle can be moved in principle without any impairment of safety to be expected. It is understood that the capture of the pre-ratchet position can be additionally queried by means of a sensor or switch. The corresponding sensor or switch signal can now be indicated optically and/or acoustically in the interior of the motor vehicle. In principle, however, a signal for a control unit of the motor vehicle can be derived from the signal in question, which prevents driving the vehicle. In any case, it is possible within the scope of the invention to increase safety explicitly and although it is basically possible for a driver to move the vehicle, the bonnet and in particular the front bonnet, is still properly secured.

In principle, the bonnet can be any flap element on or in the body of a motor vehicle. This also includes vehicle doors, a tailgate/trunk latch, a lid, a fuel filler actuator, etc. This means that the invention-based motor vehicle door lock is not used exclusively to secure a bonnet and consequently is used as a motor vehicle front bonnet latch, although such an approach is preferred.

In order to open the bonnet from the pre-ratchet position, an operator acts on by pressing or pulling the bonnet in the longitudinal direction. The mentioned movement of the bonnet in its longitudinal direction generally corresponds to a movement in the longitudinal or X-direction of the vehicle. In fact, the longitudinal direction of the vehicle is usually identified by the X-direction, while the Y-direction corresponds to the transverse direction of the vehicle. The vehicle's vertical axis direction is then identified as the Z-direction. In any case, the operator can move the bonnet in its longitudinal direction or in the X-direction or longitudinal direction of the vehicle.

For this purpose, the bonnet is hinged to the vehicle body by means of at least one hinge. The hinge allows the bonnet to move in the longitudinal direction in question, usually against spring force. The force of at least one spring realized at this point thus ensures that the bonnet can be moved against the force of the spring in the longitudinal direction by pulling or pushing but returns to its initial position when the force is omitted.

In detail, the hinge may be connected to the vehicle body via at least two articulated levers. In most cases, at least one of the two articulated levers is equipped with a pivot point that can be adjusted against the force of the previously mentioned spring. The pivot point can be fixed and released if necessary. This can be done by means of the release element inside the motor vehicle or the motor vehicle body as part of the unlocking/opening mechanism. In this context, the pivot point is essentially adjustable in the longitudinal direction of the bonnet or in the longitudinal direction of the vehicle.

In this way, the release element can act upon the pawl the first time it is actuated, so that the locking mechanism assumes the pre-ratchet position. On its second actuation, the release element can then release the pivot point, which is adjustable against the force of the spring. This means that only after the second actuation of the release element can the bonnet or front bonnet be opened in its longitudinal direction by the movement initiated by the operator. This ensures maximum safety because the adjustable pivot point of the hinge for the bonnet or front bonnet is fixed during normal operation and can therefore not be adjusted unintentionally.

However, it is also possible for the release element to act on the pawl on its first and second actuation. For example, in the event that the bonnet is secured against the vehicle body with the aid of two vehicle door locks that are spaced apart from each other, it may be necessary to proceed in this way. In this case, the first operation of the release element causes the first motor vehicle door lock to open. The second actuation of the release element then has the consequence that the second independent vehicle door lock or its pawl is acted on. As a result, the respective motor vehicle door lock or both motor vehicle door locks are each in their pre-ratchet position. The bonnet is therefore still secured and cannot be raised unintentionally, for example by airflow or other means.

The movement of the bonnet in its longitudinal direction to open from the pre-ratchet position generally corresponds to the fact that the pawl of the locking mechanism inside the motor vehicle door lock is lifted from its pre-ratchet at the rotary latch. This can, for example, be implemented and realized in detail in such a way that a contour on the bonnet interacts with the pawl. By movement of the bonnet in its longitudinal direction by an operator in the sense of a pressure or pulling action described above, the contour in question comes into contact with the pawl at or inside the bonnet and ensures that it is lifted from the pre-ratchet on the rotary latch. Now the latch is open and the bonnet can be opened as desired. When the bonnet is open, the pawl returns to its initial position under spring loading, so that when the bonnet is subsequently closed, the pawl can first immediately drop into the pre-ratchet position and then into the main-ratchet of the rotary latch. Thus the usual functionality is given when closing the bonnet.

In this context, the design can also be made in such a way that the pawl at least engages in the pre-ratchet of the rotary latch even if the operator closing the bonnet puts it down so slowly that the pre-ratchet has not yet been achieved with the current state of the art. This is possible because, within the scope of the invention, the bonnet can be held in the pre-ratchet position, as it were, in the position in which it is suspended from the vehicle body. The design of a spring that transfers the bonnet into the pre-ratchet position can therefore be selected accordingly.

Since, according to the invention, the rotary latch basically does not need to be loaded with spring force for the transition from the pre-ratchet position to the open position, this corresponds conversely to the fact that when the bonnet is closed, the locking bolt or latch holder bracket can at least swing the rotary latch into the pre-ratchet position without force, as it were, which means a counterforce of a spring does not have to be overcome. This corresponds to a further and enormous increase in safety.

As a result, a motor vehicle door lock is made available, which guarantees particularly safe operation with a simple design. In fact, it is no longer possible, for example, for a driver to drive off with the bonnet or bonnet open without securing it in place first. Rather, according to the invention, the bonnet or front bonnet in question is held at least in the pre-ratchet position of the locking mechanism. Uncontrolled lifting of the bonnet or front bonnet can thus be reliably prevented, which was previously impossible with the current state of the art. These are the fundamental advantages.

BRIEF DESCRIPTION OF DRAWINGS

In the following the invention will be explained in more detail with reference to a drawing showing only one exemplary embodiment; the following applies:

FIGS. 1 to 3 shows a motor vehicle in the front area with a bonnet and the invented motor vehicle front bonnet latch in various functional positions.

FIG. 4 shows the vehicle door lock in detail when closed.

FIG. 5 shows the object according to FIG. 4 in pre-ratchet position.

DETAILED DESCRIPTION

FIGS. 1 to 3 show a motor vehicle 1 of which only a front area or front area with a bonnet 2 can be seen. The front bonnet 2 is secured against a motor vehicle body with the aid of a motor vehicle door lock, which in the exemplary embodiment is a motor vehicle front bonnet latch 3 and is not restrictive. The interior and details of this motor vehicle door lock and the motor vehicle front bonnet latch 3 in the example case are shown in FIGS. 4 and 5 in different functional positions. These illustrations show that the motor vehicle door lock in question is essentially equipped with a locking mechanism 4, 5 consisting of a rotary latch 4 and a pawl 5.

The locking mechanism 4, 5 interacts with a latch holder bracket 6 or a locking bolt, which is arranged on the bonnet or front bonnet 2. The rotary latch 4 is pivotably located around an axis 7 in the latch case 8. The same applies to the pawl 5, which is also mounted in the latch plate 8 under definition of an axis or rotary axis 9. The two axes 7, 9 of the rotary latch 4 on the one hand and the pawl 5 on the other hand are defined with the aid of associated bolts or shoulder studs which are each connected to the latch plate 8.

The further basic structure also includes an unlocking/opening mechanism 10,11 for the bonnet 2, which can be seen for the most part in FIG. 1. The unlocking/opening mechanism 10, 11 for bonnet 2 is equipped with a release element 10 provided inside the vehicle body. It is also possible for several release elements to be installed. The release element 10 may work mechanically or electrically. The exemplary embodiment shows a mechanical variant.

In this case, the release element 10 is mechanically coupled to the motor vehicle door lock or the motor vehicle front bonnet lock 3 via a connecting means 11, in this case a cable or a Bowden cable. In fact, the connecting means 11 or the Bowden cable provided at this point works on the pawl 5 as indicated in FIG. 4. An actuation of release element 10 corresponds, according to the exemplary embodiment, to the fact that the connecting means 11 or the Bowden cable is acted on with a pulling force and consequently pawl 5 connected to the end of connecting means 11 also experiences a pulling force acted on it. This causes the pawl 5 in the exemplary embodiment to swivel counterclockwise about its axis 9, as indicated in FIG. 4.

Starting from the closed position of the pawl 4, 5 within the scope of FIG. 4, this results in the pawl 5 being lifted from a main-ratchet 12 of the rotary latch. The rotary latch 4 is designed as a fork latch with a first arm 4a and a second arm 4b. The two arms 4a, 4b are separated from each other and define a slot 4c between them, in which the latch holder bracket 6 is caught. Arm 4a is a main-ratchet arm 4a, while arm 4b is designed as a pre-ratchet arm 4b with a pre-ratchet 13.

As soon as the pawl 5 in the closed position is lifted off the rotary latch 4 according to FIG. 4, a spring not explicitly shown ensures that the rotary latch 4 is swiveled clockwise about its axis 7. Since the release element 10 is actuated only once and then returns to its initial position immediately aided by the spring, the pawl 5 can drop into the pre-ratchet position 13 after the swivel movement of the release element 10 and release of the main-ratchet 12. Now the pre-ratchet position according to FIG. 5 is reached.

To open the bonnet 2 from the pre-ratchet position according to FIG. 5, the bonnet 2 in the exemplary embodiment is acted upon by pressing or pulling in the longitudinal direction by an operator or vehicle driver, as indicated by a double arrow in FIG. 1. This means that after the initial action on by the release element 10, the locking mechanism 5 is unchanged in its pre-ratchet position. The latch holder bracket 6 is still caught by the rotary latch 4, because in this case pawl 5 has dropped into the pre-ratchet position 13 and consequently secures not only the latch holder bracket 6 but also the connected bonnet 2. To now open bonnet 2, bonnet 2 is removed from the pre-ratchet position in its longitudinal direction according to FIG. 5. The longitudinal direction is additionally shown in FIG. 3 by an arrow in the X-direction. The longitudinal direction of the vehicle corresponds to this. In contrast, the Y-direction denotes the transverse direction of the vehicle. Also drawn is a Z-direction or high axis direction.

To enable bonnet 2 to carry out the described movement in the longitudinal X direction of the vehicle, it is hinged to the vehicle body in a rotatable manner by means of at least one hinge 14, 15, 16. The hinge 14,15,16 allows for a longitudinal movement of the bonnet 2 against the force of a spring 16 as a component of the hinge 14,15,16. In fact, hinge 14, 15, 16 is a spring-loaded hinge 14, 15, 16. The detail shows two articulated levers 14, 15 and the already mentioned spring 16.

The two articulated levers 14, 15 are each connected at the ends to the bonnet 2 on the one hand and to a connecting plate 17 on the other and thus consequently to the vehicle body. At least one pivot point 18 of one articulated lever 14 is designed to be adjustable. The adjustment of the pivot point 18 corresponds to the compression of the spring 16 already mentioned. As a result, one articulated lever 14 of the two articulated levers 14, 15 can be adjusted against the force of the corresponding spring 16. In addition, the pivot point 18 in question may be fixed and released. This is shown entirely in FIG. 3, whereby a swiveling pawl 19 may provide for the fixing and releasing of the pivot point 18, which in turn is connected to the connecting means 11, acted upon with the aid of release element 10, or another connecting means to release element 10. Consequently, the release element 10 can be used to actuate the pawl 19, so that the pivot point 18 can then be moved, acted on by the spring 16.

The pivot point 18 can essentially be adjusted in the longitudinal direction of the bonnet 2. Thus an operator-initiated acting on bonnet 2 in the longitudinal direction or X-direction ensures that the pivot point 18 moves as indicated in FIG. 3. At the same time, the other second articulated lever 15 is swiveled. As a result, bonnet 2 can move in its longitudinal direction to be opened in its entirety.

When bonnet 2 is moved in its longitudinal direction or in the X-direction, a contour 20 on bonnet 2 engages with pawl 5. In the example described, two motor vehicle door locks or motor vehicle front bonnet locks 3 are each placed on the left and right of the bonnet or front bonnet 2 in contrast to the illustration according to FIG. 1, where only a centrally arranged motor vehicle front bonnet latch 3 is shown. In any case, contour 20 on the inside of bonnet 2 ensures that contour 20 moves in the X-direction against pawl 5 of latch 4, 5 during the described longitudinal movement of bonnet 2. As the pawl 4, 5 is in the pre-ratchet position according to FIG. 5, the movement of the bonnet 2 leads directly to the pawl 4, 5 being opened. This is because the pawl 5 is lifted from the pre-ratchet position 13 at the rotary latch 4.

Now the latch holder bracket 6 is completely free of the locking mechanism 4, 5 and bonnet 2 can be opened as shown in FIG. 2. The overall process is such that release element 10 on the inside 12 of the motor vehicle body, on its first actuation, acts on pawl 5 of the first motor vehicle front bonnet latch 3 and, on its second actuation, acts on pawl 5 of the second front bonnet latch 3. As a result, after the release element has been actuated twice, both motor vehicle bonnet locks 3 are in their pre-ratchet position. As soon as the front bonnet 2 is moved in the longitudinal direction or X-direction, the pawl 5 is lifted off the rotary latch 4 by means of the front bonnet 2 and the bonnet 2 can therefore be opened.

It is also possible, however, that in the case of a central motor vehicle front bonnet latch 3, for example, the locking mechanism 4, 5 is transferred to the pre-ratchet position according to FIG. 5 by the first actuation of release element 10. The second actuation of release element 10 may then ensure that the pivot point 18 is released from pawl 19. On the other hand, in the variant described first, the pivot point 18 is generally freely adjustable in the longitudinal direction of bonnet 2 and the pawl 19 is not provided at all. In any case, the second actuation of release element 10 in this variant ensures that pivot point 18 is released. This means that the operator can then act on bonnet 2 in its longitudinal direction or in the X direction so that contour 20 on bonnet 2 lifts pawl 5 from rotary latch 4. In both cases, pawl 5 is removed from the pre-ratchet position 13, so that the latch holder bracket 6 is completely released. The bonnet 2 can be opened.

The invention claimed is:

1. A motor vehicle front bonnet latch comprising:
    a locking mechanism including a rotary latch and a pawl, which interacts with a latch holder bracket on a bonnet; and
    an unlocking/opening mechanism for the bonnet, the unlocking/opening mechanism including a release element provided inside a motor vehicle body for opening the bonnet, the release element being configured to be actuated twice, wherein the locking mechanism and bonnet, after at least one actuation of the release element, assume a pre-ratchet position in which the latch holder bracket is still trapped, while the bonnet from the pre-ratchet position is opened by a movement in a longitudinal direction,
    wherein the movement of the bonnet in the longitudinal direction for opening from the pre-ratchet position corresponds to the pawl being lifted from the pre-ratchet position of the pawl on the rotary latch by a contour on the bonnet.

2. The motor vehicle front bonnet latch according to claim 1, wherein the bonnet for opening from the pre-ratchet position is acted on by pressing or pulling in the longitudinal direction by an operator.

3. The motor vehicle front bonnet latch according to claim 1, wherein the movement of the bonnet in the longitudinal direction corresponds to a movement in the longitudinal or X direction of the motor vehicle body.

4. The motor vehicle front bonnet latch according to claim 1, wherein the bonnet is rotatably articulated to the motor vehicle body by at least one hinge, the at least one hinge permitting movement of the bonnet in the longitudinal direction against a spring force.

5. The motor vehicle front bonnet latch according to claim 4, wherein the at least one hinge is connected to the motor vehicle body via at least two articulated levers.

6. The motor vehicle front bonnet latch according to claim 5, wherein at least one of the at least two articulated levers has a pivot point which is configured to be adjusted against the spring force of a spring and which is configured to be fixed and released.

7. The motor vehicle front bonnet latch according to claim 6, wherein the pivot point is configured to be adjustable in the longitudinal direction of the bonnet.

8. The motor vehicle front bonnet latch according to claim 6, wherein the release element acts on the pawl during a first actuation, so that the pawl assumes the pre-ratchet position and, during a second actuation, releases the pivot point which is configured to be adjusted against the spring force of the spring.

9. The motor vehicle front bonnet latch according to claim 1, wherein the release element acts on the pawl or during a first and second actuation so that the pawl assumes the pre-ratchet position.

10. A motor vehicle front bonnet latch comprising:
a locking mechanism including a rotary latch and a pawl, which interacts with a latch holder bracket on a bonnet; and
an unlocking/opening mechanism for the bonnet, the unlocking/opening mechanism including a release element provided inside a motor vehicle body for opening the bonnet, the release element being configured to be actuated twice, wherein the locking mechanism and bonnet, after at least one actuation of the release element, assume a pre-ratchet position in which the latch holder bracket is still trapped, while the bonnet from the pre-ratchet position is opened by a movement in a longitudinal direction,
wherein the bonnet is rotatably articulated to the motor vehicle body by at least one hinge, the at least one hinge permitting movement of the bonnet in the longitudinal direction against a spring force,
wherein the at least one hinge is connected to the motor vehicle body via at least two articulated levers,
wherein at least one of the at least two articulated levers has a pivot point which is configured to be adjusted against the spring force of a spring and which is configured to be fixed and released, and
wherein the release element acts on the pawl during a first actuation, so that the pawl assumes the pre-ratchet position and, during a second actuation, releases the pivot point which is configured to be adjusted against the spring force of the spring.

* * * * *